US007422521B2

(12) United States Patent
Peterson

(10) Patent No.: US 7,422,521 B2
(45) Date of Patent: *Sep. 9, 2008

(54) METHOD OF DETERMINING SKILL LEVEL IN A TOURNAMENT SETTING

(75) Inventor: Randall S. E. Peterson, Vancouver (CA)

(73) Assignee: Duplicate (2007) Inc., New York, NY (US)

( * ) Notice: Subject to any disclaimer, the term of this patent is extended or adjusted under 35 U.S.C. 154(b) by 889 days.

This patent is subject to a terminal disclaimer.

(21) Appl. No.: 10/614,752

(22) Filed: Jul. 8, 2003

(65) Prior Publication Data

US 2004/0132521 A1 Jul. 8, 2004

Related U.S. Application Data

(60) Provisional application No. 60/393,736, filed on Jul. 8, 2002.

(51) Int. Cl.
*A63F 13/00* (2006.01)
*G06F 17/00* (2006.01)

(52) U.S. Cl. ................................ 463/9; 463/43; 463/16

(58) Field of Classification Search ................... 463/13, 463/14, 2, 9, 43, 16; 700/91-93
See application file for complete search history.

(56) References Cited

U.S. PATENT DOCUMENTS

| | | | | |
|---|---|---|---|---|
| 5,857,911 | A | 1/1999 | Fioretti | |
| 5,879,233 | A | 3/1999 | Stupero | |
| 5,935,002 | A | 8/1999 | Falciglia | |
| 6,012,984 | A | 1/2000 | Roseman | |
| 6,174,237 | B1 * | 1/2001 | Stephenson | 463/42 |
| 6,604,997 | B2 * | 8/2003 | Saidakovsky et al. | 463/9 |
| 6,824,462 | B2 * | 11/2004 | Lydon et al. | 463/9 |
| 7,104,542 | B2 * | 9/2006 | Peterson | 273/274 |

* cited by examiner

*Primary Examiner*—Scott Jones
*Assistant Examiner*—Frank M Leiva
(74) *Attorney, Agent, or Firm*—Ked & Associates LLP

(57) ABSTRACT

The present invention is directed to a method of determining a most skilled individual from a group of individuals in a tournament setting over a computer network. A method of determining skill level in a card game in a tournament setting comprises assigning players to a plurality of tables, each table consisting of a predetermined number of labelled positions. Cards are provided to each player over the network such that players seated at positions with the same label at each table have the same cards. The performance of players at the same position at different tables is compared after playing a game and such players are ranked as a measure of their skill level.

22 Claims, 4 Drawing Sheets

METHOD OF DETERMINING SKILL LEVEL IN A TOURNAMENT SETTING

This application is a non-provisional of U.S. Provisional Application No. 60/393,736 filed on Jul. 8, 2002, the content of which is hereby incorporated by reference.

BACKGROUND OF THE INVENTION

1. Field of the Invention

The present invention is generally directed to skilled gaming and more specifically to a method of determining skill level in a tournament setting.

2. Description of the Prior Art

There are many games of chance that require substantial skill and knowledge to be able to play well such as poker style games, Bridge, Euchre, Hearts and Cribbage. Even though the game process is dependent on chance, through the random dealing of cards, a knowledgeable and skilled player is, over time, usually more successful than the unskilled competitor. For instance, the skill of a poker player is usually gauged by the amount of money the player has won by the end of a session and not by how many times the player has had a winning hand. This monetary success depends on the betting strategy of the skilled player, which includes the choice of not playing bad hands, as well as, betting appropriately on good hands. In the short term, the elements of chance may predominate but skill plays a substantial and defining role in the final outcome. In addition to the chance elements introduced by the dealt cards, there is a significant amount of unpredictability introduced by player interaction that adds to the play and characteristics of each game. Players act and react accordingly using their skills to allow them to control or minimize these unpredictabilities. Most skill games have unpredictabilities that form the basis for the application of skill sets and judging criteria. When a player has control over and can react to unpredictabilities then these do not constitute elements of chance.

Skill has several definitions and interpretations, all of which conclude that an activity is skilful if a player can significantly affect the outcome of play as a result of their own actions. Examples of the skills required for playing various games include knowledge of game rules and theory, strategic planning, organizational skills, knowledge of game mathematics (card and betting odds), money management, intelligence, logic, discipline, game adaptability, psychology, manipulation, deception and bluffing and long and short term memory.

In many card games, the elements of chance are introduced by the shuffling and the random dealing of the cards. It is possible through this process alone for a player to receive an unbeatable hand in the first instance and no matter what application of skill takes place the outcome cannot be significantly altered by the application of skill or player action. In the short term, pure chance can succeed. Hence most card games are defined as games of mixed chance and skill and are gambling games. Skill, over the long term, does however dominate play for the most part.

In prior art network-based game systems, where players compete head to head against a computer, it is relatively simple to have all competitors in a given tournament play an identical hand and compare the outcome. The player who scores the highest score under the same playing conditions becomes the winner. This is the scoring basis for many of the skill games played on the Internet presently. It can be applied to games of mixed chance and skill, however this environment is sterile and lacking the player interaction that accounts for much of the skill in playing poker and other similar games. The normal characteristics and playability of the game are not maintained. For example, in the case of video poker, the only skill set that usually comes in to play is the knowledge of the law of probability and the player cannot significantly affect the outcome of the game.

It is an object of the present invention to provide a method of determining skill level in a tournament game setting.

SUMMARY OF THE INVENTION

The present invention is directed to a method of determining a most skilled individual from a group of individuals in a tournament setting.

The purpose of this game play methodology is to significantly reduce or remove the influence of chance from the scoring criteria for game play and thus allow games of mixed chance and skill, like Texas Holdem Poker, and the like, to be played as a skill game. In doing so, the judging criteria for the tournament will depend entirely on the skill abilities of the players and not be unduly influenced by the elements of chance. Individuals are divided into various tournament tables and each player is designated a position at the table. The players located in the same position at each table then compete against each other to determine which player is the most skilled by playing card games against players at their own table. The dealing of the card hands is mirrored over each of the tables so that the players in each tournament group are dealt the same hand. By causing each player in each tournament group to play the same hand, a player's skill level may be determined.

In accordance with one aspect of the present invention, there is provided a method of determining skill level in a card game in a tournament setting over a computer network. The method comprises assigning players to a plurality of tables, each table consisting of a predetermined number of labelled positions. Cards are provided to each player over the network such that players seated at positions with the same label at each table have the same cards. The performance of players at the same position at different tables is compared after playing a game and such players are ranked as a measure of their skill level.

In accordance with another aspect of the present invention, there is provided a game system for playing a card game in a tournament setting. The system comprises a plurality of individual players, a host server connected to each of the players over a network. The host server includes a tournament module to divide the players into tournament groups, and provide a table designation and table position to each player, each table position corresponding to a tournament group. The host server further includes a dealing module to provide the same cards to each player with the same table position. The host server also includes a monitoring module to track the gameplay at each table and a ranking module to compare the performance of players within each tournament group.

BRIEF DESCRIPTION OF THE DRAWINGS

These and other features of the preferred embodiments of the invention will become more apparent in the following detailed description in which reference is made to the appended drawings wherein.

DESCRIPTION OF THE PREFERRED EMBODIMENTS

Figure 1:
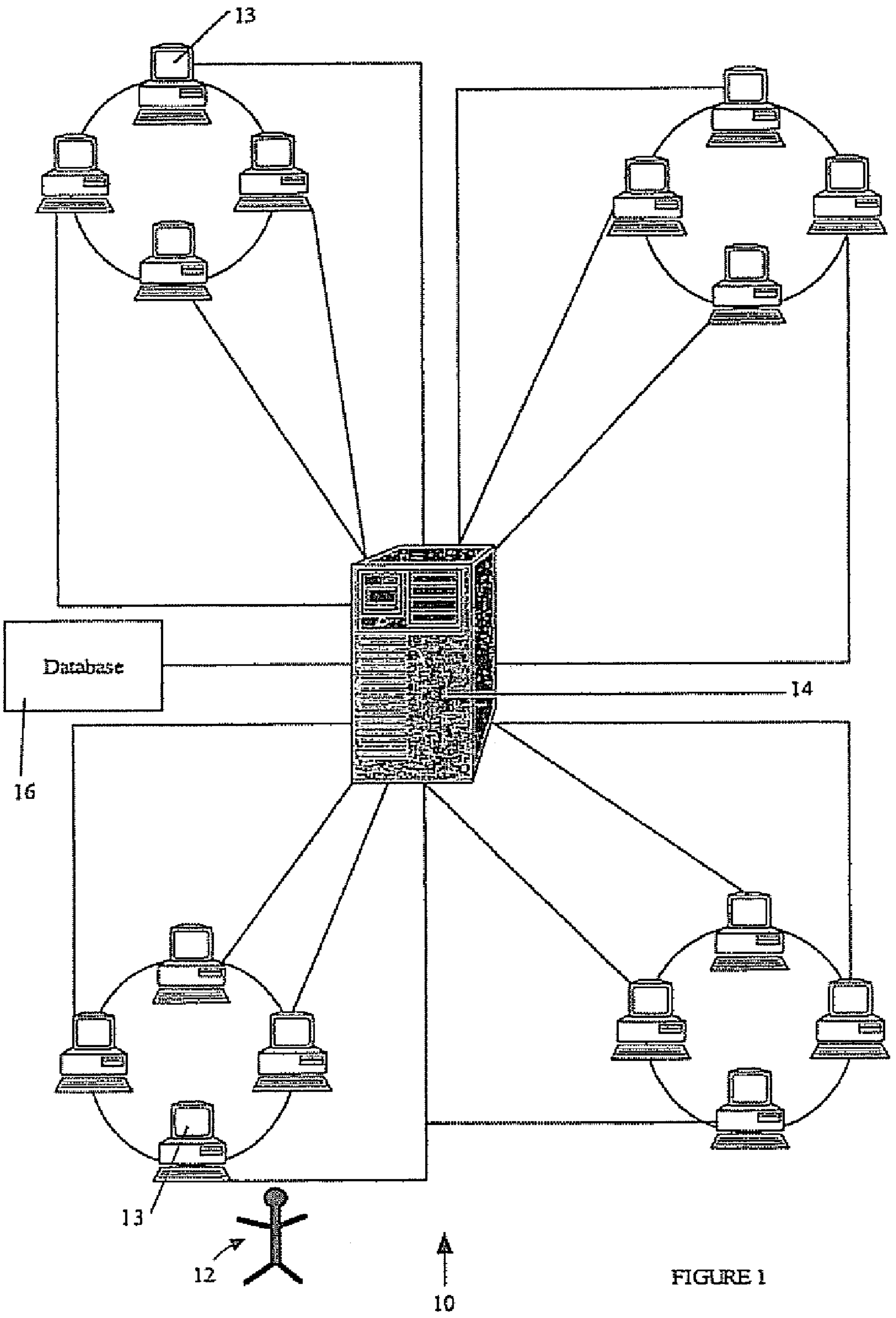
FIG. 1 is a schematic diagram of a network for implementing a method of the present invention.
Figure 2:
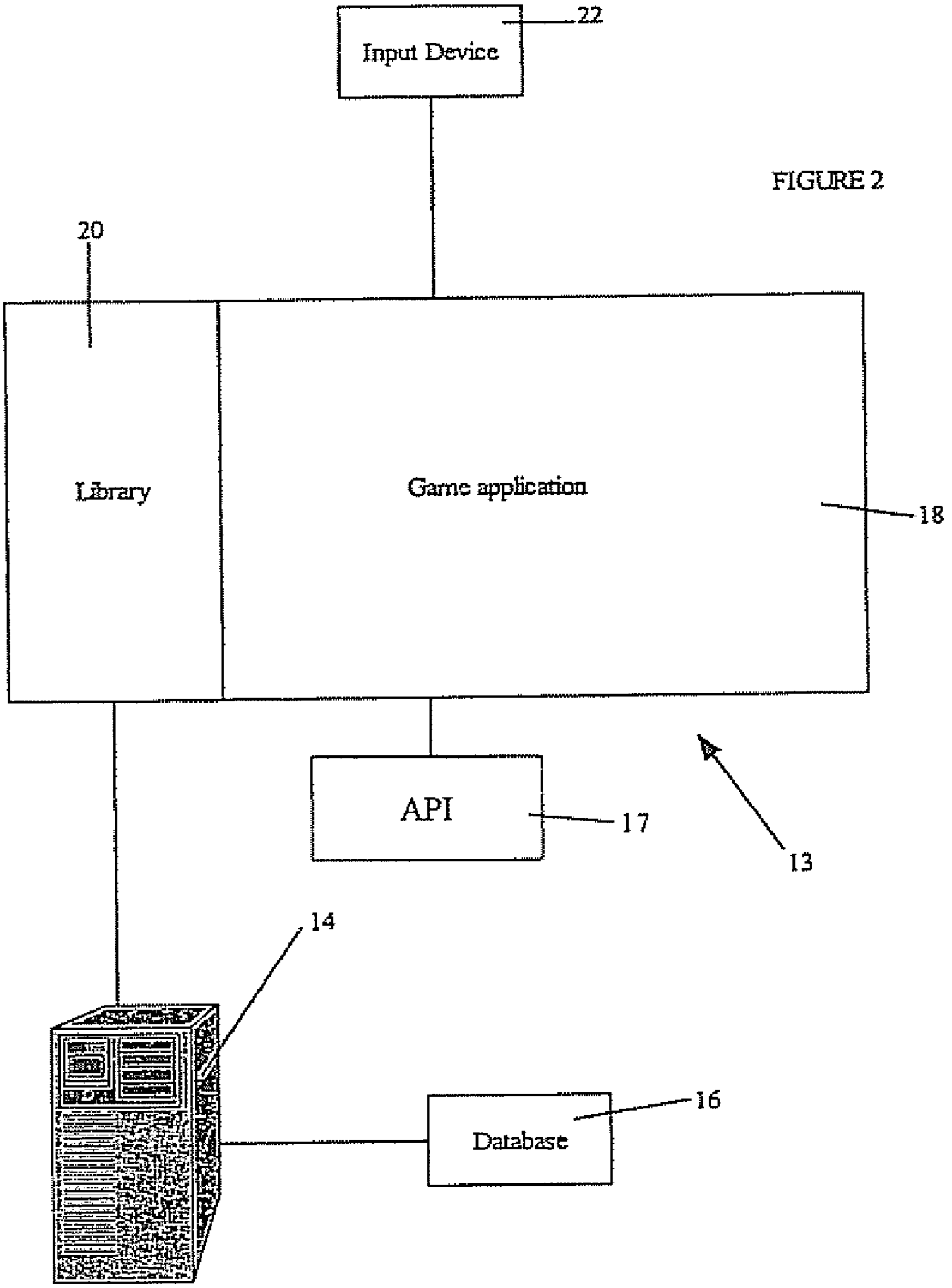
FIG. 2 is a schematic diagram of a computer for use in the network of FIG. 1.

Turning to FIG. 1, a schematic diagram of a system for implementing a first embodiment of a method of determining the skill level of an individual in a tournament setting is shown. In the present example, there are sixteen individuals who have been selected to participate in a card tournament. The system 10 comprises individuals 12 (interacting with computers 13), which are connected over a network, such as the Internet, to a host server 14. The host server 14 is also connected to a database 16 which stores tournament information. The host server 14 controls the tournament and handles the game play interaction between the individuals 12. As can be seen in FIG. 2, each of the computers 13 includes a game application 18 and a library 20. The game application 18 comprises proprietary software for the configuration of the tournament game play while the library 20 receives and transmits data packets from and to the host server 14. An application program interface (API) 17 controls the communication between the game application 18 and the library 20, as well as, the communication between the library 20 and the host server 14. The host server 14, tracks changes in the database 16 and updates each library 20 with necessary modifications to the software component of the game application 18. An input device 22 is connected to the computer to allow individuals 12 to control the computer 13, i.e. to play their cards. The computer 13 includes a computer screen to provide displayed information to the player.

Figure 3:
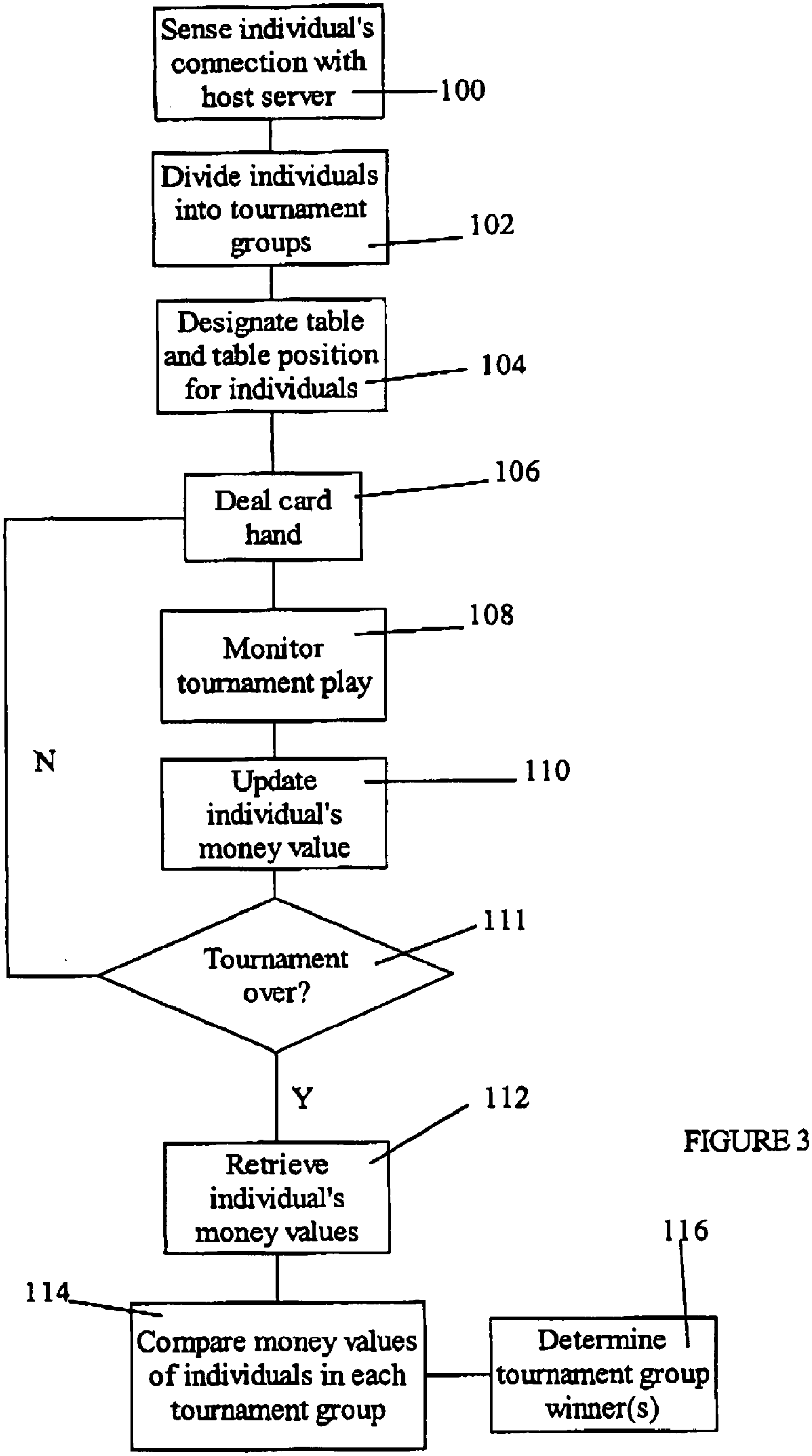
FIG. 3 is a flowchart outlining steps of an embodiment for determining a skill level of an individual in a tournament setting.
Figure 4:
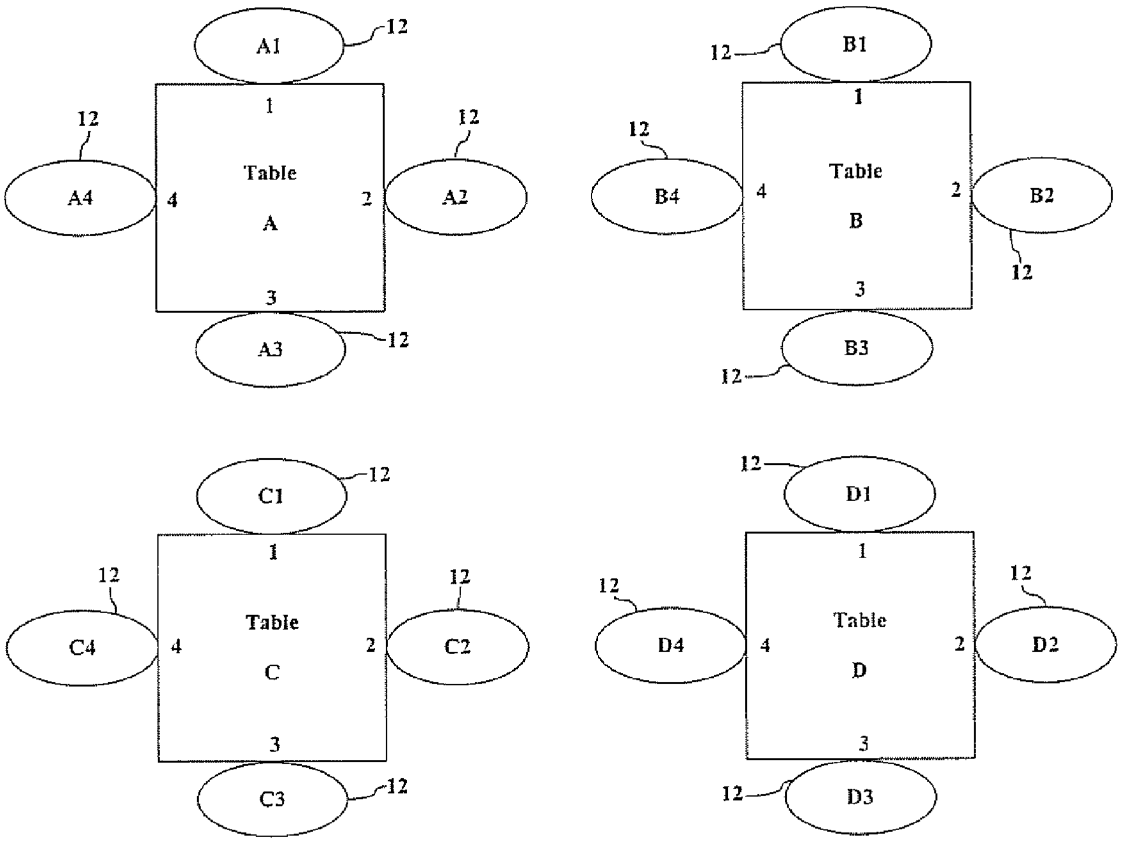
FIG. 4 is a schematic diagram of how individuals are divided into tournament groups.

In operation, as outlined by the flowchart of FIG. 3, after each of the individuals 12 has connected to the host server 14 via their computer 13 (step 100), the host server 14 divides the individuals 12 into tournament groups for playing a game such as poker (step 102). In the present example, the individuals 12 are divided into 4 tournament groups such as tournament group 1, tournament group 2, tournament group 3 and tournament group 4. After the tournament groups are determined, each of the individuals 12 is given a table designation and table position (step 104). In the present embodiment, the tables are designated as Table A, Table B, Table C and Table D while the positions are designated as 1, 2, 3 and 4 as schematically shown in FIG. 4. Therefore table A comprises players A1, A2, A3 and A4, table B comprises players B1, B2, B3 and B4, table C comprises players C1, C2, C3 and C4 and table D comprises players D1, D2, D3 and D4. Unlike other prior art tournaments whereby the individuals at each table compete among themselves to determine the most skilled player, the method of the present invention is directed at determining the most skilled player by comparing the individuals 12 seated in the same position at each table (or in the same tournament group). Therefore, players A1, B1, C1 and D1 compete in tournament group 1, players A2, B2, C2 and D2 compete in tournament group 2, players A3, B3, C3 and D3 compete in tournament group 3 and players A4, B4, C4 and D4 compete in tournament group 4. Preferably, the individuals 12 are ranked based on their previous play prior to being divided into tournament groups so that individuals 12 with similar skill may be distributed evenly among the tables. It will be recognized that such an arrangement will avoid an excess of skilled players at one table.

The host server 14 then deals the cards (step 106) to the individuals 12, to commence the tournament by sending messages to the libraries 20 of the computers 13 to indicate which cards have been dealt to the individual 12. The library 20 receives the information and transmits this information to the game application 18 which displays the card hand on the computer screen. The cards hands that are dealt to the individuals 12 at each table is mirrored over each of the tables such that all of the individuals 12 in each tournament group receive the same card hand. However, all of the card hands between each of the individuals 12 at the table are different. This is achieved by pre-programming the host server 14 to deal pre-determined card hands to table positions.

After the card hands are dealt, the individuals 12 at each table compete against each other in the selected card game while the host server 14 monitors the game play (step 108). For poker, each of the individuals 12 are provided a starting money value. The individuals 12 attempt to create the highest scoring poker hand using the cards they are dealt in order to increase their money value. Networked game play involving computers and input devices will be known to one skilled in the art. The game proceeds with the individuals 12 playing their hands and exchanging cards with the deck. This is facilitated by the individual 12 using the input device 22 to select the cards to be discarded. After the game application 18 senses the actions of the individual 12 this information is communicated to the library 20 which sends a message to the host server 14 indicating how many cards the individual 12 wants to exchange. The host server 14 then accesses the database 16 to determine which cards to exchange and sends a message back to the library to indicate the new cards. The library 20 then transmits this information to the game application 18 and the game application updates the card hand on the computer screen. During the round of poker play, players may bet or fold. For each bet, ante or fold, the library 20 sends a message to the host server 14 to indicate the play of the individual 12. The database 16 is updated each time a new money value is submitted for an individual 12. The information on bets placed by the individual 12 are thus made available to other individuals 12 at the same table. These individuals 12 see the bets placed by the other individuals 12 at their table in real-time and use this information to decide on their own actions. After each card hand is completed, the host server 14 determines which individuals 12 have earned money and which individuals 12 have lost money and updates the individuals' libraries 20 and the database 16 accordingly (step 110). The host server 14 then determines if a pre-determined time limit for tournament play has elapsed (step 111). If it has not, the individuals 12 are then dealt a new card hand (step 106) which is once again replicated over each of the other tables. In this manner, the individuals 12 in tournament group 1 at each table continuously receive the same cards. If the time limit has elapsed, the host server 14 determines which individuals have won their tournament game by accessing the database 16 (step 112). By comparing the money values of each of the individuals 12 in each tournament (step 114), the host server 14 determines which individual 12 won each tournament group (step 116). Since each of these individuals 12 has been dealt the same cards, the most skilled player of each tournament group is determined to be the one with the highest money value since it is the individual's application of their skill in the poker card game which determines the outcome.

For instance, if player A1 receives poor card hands and their money value was lower than their starting money value, it is possible that they are still the most skilled individuals in their tournament group since all of the individuals in the tournament group would have been dealt the same card hands and most likely lost compared to the other individuals at their table. How the individual uses their skill to determine a strategy and/or money management plan which maximizes the wins and minimizes the losses is a factor in determining the most skilled individual of each tournament group.

The amount won or lost with regard to the other players at the table is part of the scoring criteria but has no bearing on the determination of the most skilled individual in each tournament group. The main variable coming into play for scoring is how the individuals applied skill throughout the game.

After the initial round of play has been completed, the process may then be repeated so that the most skilled in each tournament group may be pitted against each other while the second place finishers of each tournament group compete against each other and similarly with the third and fourth place players of each tournament group. The four individuals 12 ranked as the most skilled in their respective tournament groups would be dealt hands from the host server 14 as two tables with two individuals 12 at each table. In this manner, two most skilled individuals 12 may be determined by the host server 14 from the group of sixteen individuals rather than four winners from the four tournament groups.

It will be recognized that in the above there is a possibility of a tie between two or more players when the determination of skill is made. This would occur when the players obtain the same results with the same cards. In this case, the host server 14 may deal another game in order to break the tie.

In the event of a communication disruption or computer malfunction, there is the possibility that an individual 12 may become disconnected from the host server 14. If this were to happen, upon detection, the host server 14 would preferably automatically post the blind or ante, and subsequently fold, until such time as the individual 12 re-established their connection to the host server 14. Alternatively, a individual 12 may select at the commencement of the tournament from a selection of strategies. In the event of a disconnection, the selected strategy would be initiated and followed by the host server until such time as the player re-established their connection.

In poker, it may be difficult to monitor the number of draw cards for an individual 12. Individuals 12 are generally allowed to exchange one to three cards in their card hand with cards from the deck. This may cause the cards hands between individuals 12 in each tournament group to be different since each individual 12 may not select the same number of cards for exchange. This introduces an element of chance and reduces the focus on skill level of the individual 12. For a draw game to work (such as poker), a standard card draw may be implemented which applies to each individual 12 equally. Alternatively, the draw cards may be prearranged up to a maximum allowable number so that the drawing does not affect the remainder of the deck of cards.

Alternatively, the statistics of all of the individuals 12 may be stored in the database 16 so that when the individuals 12 play at a later date, they may be grouped with other individuals 12 of equal skill level. Individuals 12 of like ranking may be organised in a tournament group. It is not necessary that all individuals 12 at a table be of similar skill level since the individuals 12 are not judged against each other. Therefore the dispersement of skill may be equal for each of the tournament tables.

Alternatively, the tournament may occur in a physical environment where the card hands are dealt by a dealer. In this manner, it would be more time consuming to set up the cards such that the individuals 12 in each tournament group at each table are dealt the same hand.

In an alternative embodiment, the win/loss ration of the players may be used to calculate a points difference penalty for the winner of the table. This may provide a further aspect of challenging players to use their skill during the tournament.

In yet another embodiment, if the tournament game involves partnering individuals 12, computer-implemented players may be used which are programmed to play cards on computer 13 according to cards played by each individual 12, or individuals 12 may compete against computer-implemented players with their final score compared with other individuals 12 competing against the same computer-implemented player.

It will be understood that although the present method has been discussed in a card tournament setting, it may be implemented in non-card tournaments. It will be apparent to one skilled in the art that the present method may be used in games involving dice, such as by way of example only, monopoly or backgammon.

Alternatively, upon connection of their computer 13 with the host server 14, the individuals 12 may be given table designations and positions without being placed in a tournament group. Instead, once the table positions are filled, the host server 14 then creates the tournament groups by selecting the individuals located at the same position at each table.

In another embodiment, the tournament may be based on a number of rounds (or dealt card hands) rather than time-based.

Although, it is preferable that each table has the same number of individuals so that tournament groups of equal number may be established.

Furthermore, the method of the present invention may be implemented over any multi-user communication network such as the Internet, a local area network (LAN), a wide area network (WAN), wireless application protocol (WAP) telephone, interactive TV etc. . .

Along with the comparison between individuals in a tournament group, the individuals may be compared with the score of individuals at their table for further skill determination.

In another embodiment, where the card suits are not important such as in blackjack, the card hands may be dealt such that they have the same numerical values. For instance, one individual may be dealt a 5 of hearts and a 10 of clubs while a second individuals is dealt a 5 of diamonds and a 10 of spades. This reduces the chance of cheating by individuals who are keeping track of the card hands.

In yet another embodiment, the host server 14 reassigns the players to different tables after every hand. In this embodiment, the players maintain the same table positions but are the host server 14 randomly rotates the table assignments after every hand. It will be appreciated that this arrangement maintains the tournament groups but helps to protect against fraud.

In still another embodiment, a robot player is used to facilitate certain tournament arrangements and comparisons. Robot players may be employed to compare the skill of two players when no other players are available. In particular, these robot players may be used in the case described above where the two most skilled players are determined in order to determine which of the two is more skilled.

In a further embodiment, a round-robin tournament is dealt by the host server 14. The host server 14 deals a set number of card hands to each player at one table position. Then the host server 14 reassigns the players to a different table position and deals the hands previously dealt to the player at this different table position, repeated until the host server 14 has dealt the players the cards for each table position. As will be apparent to one skilled in the art this embodiment allows the determination of the most skilled player in a tournament setting without proceeding to smaller sized tournaments. Moreover, it is not necessary for the table assignments from the host server 14 to be maintained for each hand. The host server 14 may rotate players to different table positions at different tables.

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. A method of determining a skill level for individuals playing a card game in a tournament setting and being connected over a computer network, said method comprising:

a) arranging said individuals into a plurality of groups;

b) assigning said individuals to a plurality of tables, each of said plurality of tables comprising a predetermined number of positions each having a respective label for each of said plurality of groups;

c) providing cards to said individuals over said network such that individuals assigned to positions with the same label at each table have the same cards; and d) comparing performance of individuals in the same group being at the same position at different tables after playing a game against others assigned to the same table and ranking said individuals as a measure of skill based on said performance.

2. A method according to claim 1 wherein said card game is poker.

3. A method according to claim 2, wherein said performance is determined according to the amount of money said individuals have at the end of said card game.

4. A method according to claim 1, wherein said individuals are ranked based on previous play prior to being assigned to said tables to obtain an even distribution of skilled individuals.

5. A method according to claim 1, wherein like-ranked individuals from each of said plurality of groups are reassigned to a common group in the next round of play.

6. A method according to claim 1, wherein said card game includes a draw.

7. A method according to claim 6, wherein said draw uses a fixed number of said cards.

8. A method according to claim 6, wherein cards used for said draw are pre-selected.

9. A method according to claim 1, comprising repeating game play for a predetermined amount of time.

10. A method according to claim 1, comprising repeating game play for a fixed number of rounds.

11. A method according to claim 1, wherein said card game is blackjack.

12. A game system for playing a card game in a tournament setting comprising:

a) a plurality of computers to be used by a plurality of individuals;

b) a host server connected to each of said plurality of computers over a network;

c) a tournament module executed by said host server said tournament module being configured to divide said individuals using said computers into a pluarality groups, and to assign said individuals to a plurality of tables, where said tables each comprise a predetermined number of positions each having a respective label corresponding to a respective one of said groups;

d) a dealing module executed by said host server, said dealing module being configured to provide cards to said computers over said network such that individuals assigned to positions with the same label at each table have the same cards;

e) a monitoring module executed by said host server and being configured to track game play at each said plurality of tables; and f) a ranking module executed by said host server and being configured to compare performance of individuals in the same group being at the same position at different tables after playing a game against others assigned to the same table and rank said individuals as a measure of skill based on said performance.

13. A game system according to claim 12 wherein said card game is poker.

14. A game system according to claim 13, wherein said performance is determined according to the amount of money said individuals have at the end of said card game.

15. A game system according to claim 12, wherein said individuals are ranked based on previous play prior to being assigned to said tables to obtain an even distribution of skilled individuals.

16. A game system according to claim 12, wherein like-ranked individuals from each of said plurality of groups are reassigned to a common group in the next round of play.

17. A game system according to claim 12, wherein said card game includes a draw.

18. A game system according to claim 17, wherein said draw uses a fixed number of said cards.

19. A game system according to claim 17, wherein cards used for said draw are pre-selected.

20. A game system according to claim 12, comprising repeating game play for a predetermined amount of time.

21. A game system according to claim 12, comprising repeating game play for a fixed number of rounds.

22. A game system according to claim 12, wherein said card game is blackjack.

* * * * *